United States Patent [19]

Tannaka et al.

[11] Patent Number: 5,507,293
[45] Date of Patent: Apr. 16, 1996

[54] ULTRASONIC DIAGNOSTIC APPARATUS

[75] Inventors: Yoshinao Tannaka; Yasuhiro Nakamura, both of Kanagawa; Yuzo Yoshimoto, Yokohama, all of Japan

[73] Assignee: Matsushita Electric Industrial Co., Ltd., Osaka, Japan

[21] Appl. No.: 354,003

[22] Filed: Dec. 5, 1994

[30] Foreign Application Priority Data

Dec. 7, 1993 [JP] Japan .................................. 5-306392

[51] Int. Cl.⁶ ............................................... A61B 8/00
[52] U.S. Cl. ............................................... 128/661.01
[58] Field of Search ................... 128/660.01, 660.06, 128/660.07, 661.01, 661.03, 661.08, 661.09, 661.10; 73/625, 626, 597, 602

[56] References Cited

U.S. PATENT DOCUMENTS

| 5,269,307 | 12/1993 | Fife et al. | 128/661.01 |
| 5,269,309 | 12/1993 | Fort et al. | 128/661.01 |

FOREIGN PATENT DOCUMENTS

| 0072498 | 2/1983 | European Pat. Off. . |
| 0140450 | 5/1985 | European Pat. Off. . |
| 0215137 | 3/1987 | European Pat. Off. . |
| 0222450 | 5/1987 | European Pat. Off. . |
| 0577982 | 1/1994 | European Pat. Off. . |

Primary Examiner—George Manuel
Attorney, Agent, or Firm—Pollock, Vande Sande & Priddy

[57] ABSTRACT

Ultrasonic wave is emitted into an examined body. A first electric echo signal is generated in response to an echo of the ultrasonic wave. A controllable filter responsive to a control signal serves to extract components of the first electric echo signal which are in a desired frequency band, so that the first electric echo signal is converted into a second electric echo signal. A logarithmic detection device serves to subject the second electric echo signal to logarithmic compression and detection. A signal generator is operative for outputting plural calibration signals having different frequencies and different amplitudes. An input selection device is operative for connecting the signal generator with an input terminal of the filter during a calibration mode of operation. A control device is operative for calculating a corrective value from an output signal of the logarithmic detection device during the calibration mode of operation, and correcting a logarithmic conversion characteristic and an offset of the logarithmic detection device and the control signal to the filter in response to the calculated corrective value during reception of echoes of the ultrasonic wave.

8 Claims, 5 Drawing Sheets

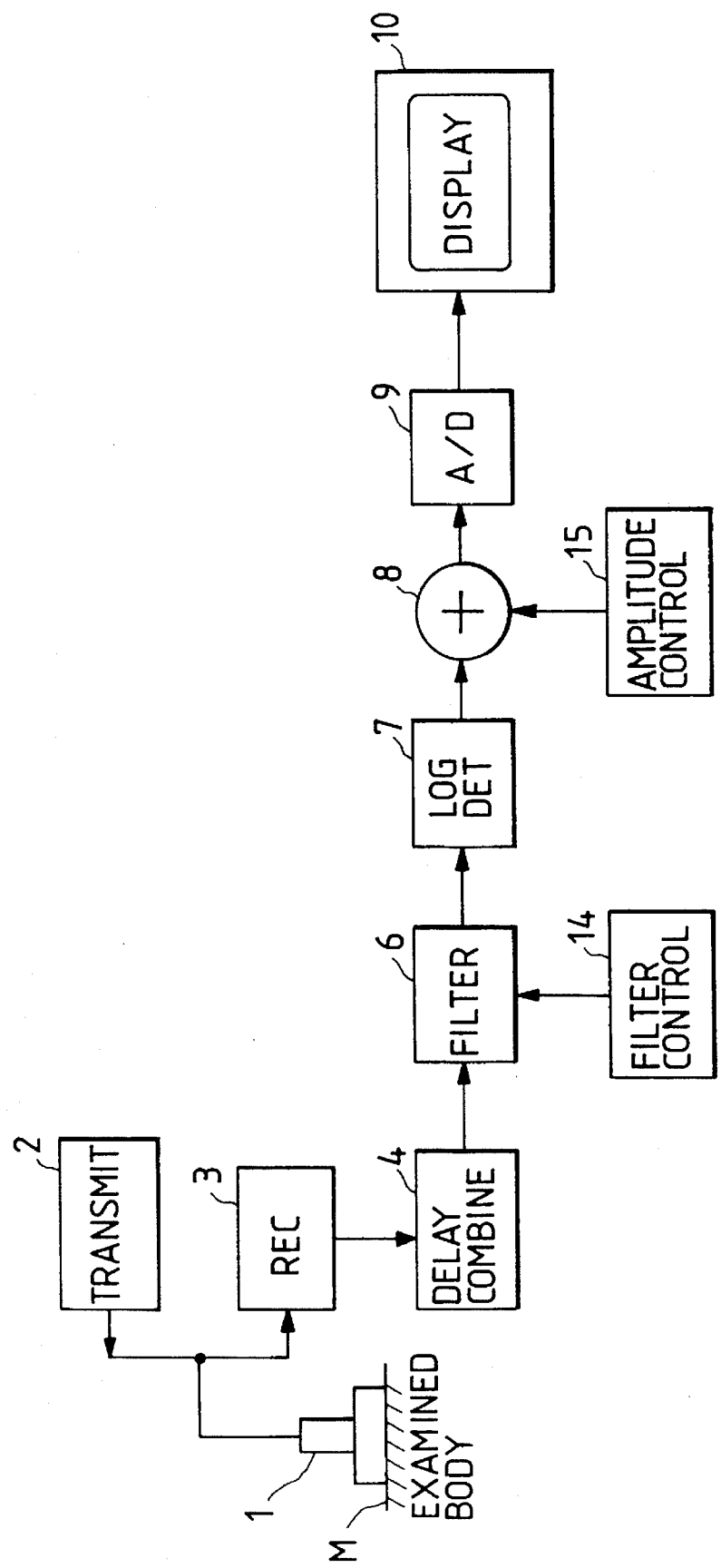

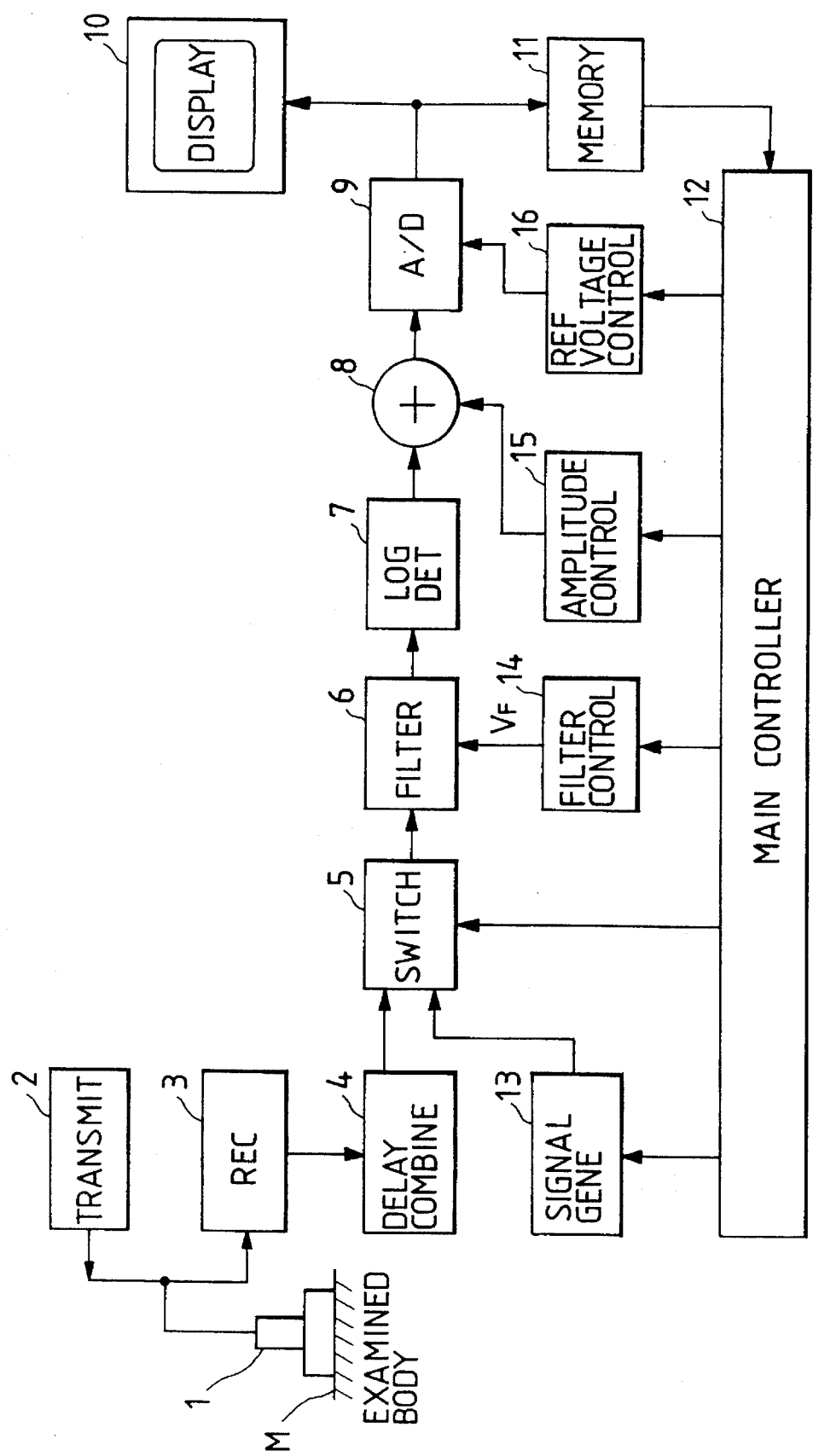

5,507,293

ULTRASONIC DIAGNOSTIC APPARATUS

BACKGROUND OF THE INVENTION

1. Field of the Invention

This invention relates to an ultrasonic diagnostic apparatus for producing an image, for example, a sectional image, of an examined body by emitting a beam of ultrasonic wave thereinto and receiving related echoes therefrom.

2. Description of the Prior Art

Typical ultrasonic diagnostic apparatuses emit a beam of ultrasonic wave into an examined body, and receive related ultrasonic echoes therefrom. The received ultrasonic echoes are converted into corresponding electric echo signals. A sectional image of the examined body is generated in response to the electric echo signals.

To increase the S/N (signal-to-noise) ratio of the image of the examined body, a filter tuned to the frequency bands of the electric echo signals is provided which removes noise components from the electric echo signals. Generally, the frequency band of an electric echo signal moves toward a lower side as the electric echo signal relates to a deeper portion of an examined body. Thus, the filter is generally of the tunable type, being responsive to a tuning control signal. The pass band of the filter is adjusted in response to the tuning control signal so as to match the frequency band of a currently-processed electric echo signal.

The control-signal response characteristic and the frequency response characteristic tend to vary from filter to filter. Accordingly, in each ultrasonic diagnostic apparatus, complicated adjustment containing manual processes is usually required to compensate for such a characteristic variation regarding a filter.

SUMMARY OF THE INVENTION

It is an object of this invention to provide an improved ultrasonic diagnostic apparatus.

A first aspect of this invention provides an ultrasonic diagnostic apparatus comprising means for emitting ultrasonic wave into an examined body; means for generating a first electric echo signal in response to an echo of the ultrasonic wave; a controllable filter responsive to a control signal for extracting components of the first electric echo signal which are in a desired frequency band, and thereby converting the first electric echo signal into a second electric echo signal; a logarithmic detection device for subjecting the second electric echo signal to logarithmic compression and detection; a signal generator for outputting plural calibration signals having different frequencies and different amplitudes; input selection means for connecting the signal generator with an input terminal of the filter during a calibration mode of operation; control means for calculating a corrective value from an output signal of the logarithmic detection device during the calibration mode of operation, and correcting a logarithmic conversion characteristic and an offset of the logarithmic detection device and the control signal to the filter in response to the calculated corrective value during reception of echoes of the ultrasonic wave.

A second aspect of this invention provides an ultrasonic diagnostic apparatus comprising means for emitting ultrasonic wave into an examined body; means for generating a first electric echo signal in response to an echo of the ultrasonic wave; a controllable filter responsive to a control signal for extracting components of the first electric echo signal which are in a desired frequency band, and thereby converting the first electric echo signal into a second electric echo signal; a logarithmic detection device for subjecting the second electric echo signal to logarithmic compression and detection; a signal generator for outputting plural calibration signals having different frequencies and different amplitudes; input selection means for connecting the signal generator with an input terminal of the filter during a calibration mode of operation; a filter control device for controlling a pass band of the filter at a desired pass band; a gain control device for generating a gain control signal; an adder for adding an output signal of the logarithmic detection device and the gain control signal; an A/D converter for converting an output signal of the adder into a corresponding digital signal; a reference voltage control device for controlling a reference voltage fed to the A/D converter; a memory for storing an output signal of the A/D converter; and control means for controlling the input selection means to connect the signal generator with the input terminal of the filter during the calibration mode of operation, controlling the signal generator in accordance with a calibration sequence, reading out the signal from the memory and calculating corrective values for control signals outputted from the filter control device, the gain control device, and the reference voltage control device in response to the readout signal, and correcting the control signals outputted from the filter control device, the gain control device, and the reference voltage control device in response to the corrective values during reception of echoes of the ultrasonic wave.

A third aspect of this invention provides an ultrasonic diagnostic apparatus comprising a signal processor having a controllable signal processing characteristic; means for generating an electric echo signal: means for generating a predetermined calibration signal; means for applying the calibration signal to the processor during a first interval; means for generating a corrective signal in response to an output signal of the processor during the first interval; means for applying the echo signal to the processor during a second interval different from the first interval; and means for controlling the characteristic of the processor in response to the corrective signal during the second interval.

It is preferable that the processor includes one of a tunable filter, a logarithmic detector, and an A/D converter.

BRIEF DESCRIPTION OF THE DRAWINGS

FIG. 1 is a block diagram of a prior-art ultrasonic diagnostic apparatus.

FIG. 2 is a block diagram of an ultrasonic diagnostic apparatus according to a first embodiment of this invention.

DESCRIPTION OF THE PREFERRED EMBODIMENTS

Figure 3A:
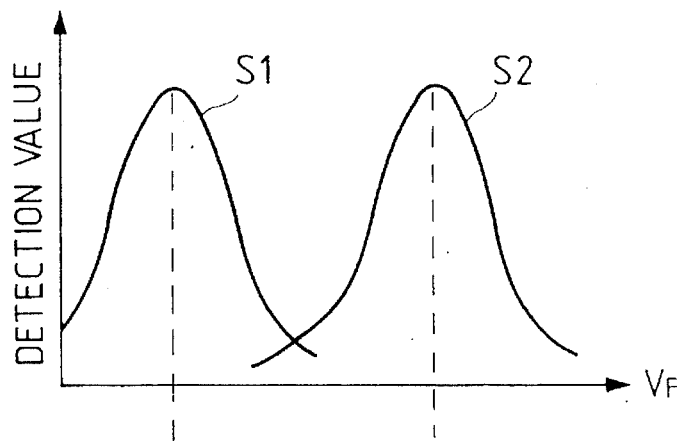
FIG. 3 has a diagram of a relation between a detection value and a filter control signal in the apparatus of FIG. 1, and also a diagram of relations between a filter control signal and a filter passband central frequency in the apparatus of FIG. 1.

Before the description of embodiments of this invention, a prior-art ultrasonic diagnostic apparatus will be described for a better understanding of this invention.

With reference to FIG. 1, a prior-art ultrasonic diagnostic apparatus includes an ultrasonic probe 1 electrically connected to a transmission circuit 2 and a receiving circuit 3. When the prior-art ultrasonic diagnostic apparatus is actually used, the ultrasonic probe 1 remains in contact with the surface of an examined body M such as a human body.

The ultrasonic probe 1 includes an array of piezoelectric transducers (electric-ultrasonic transducers). The piezoelectric transducers are sequentially activated by electric output signals of the transmission circuit 2 so that pulses of a beam of ultrasonic wave are emitted into the examined body M.

Echoes of the pulses of the ultrasonic wave beam are generated at organs of the examined body M. The ultrasonic echo pulses are received by the ultrasonic probe 1, being converted into corresponding electric echo signals thereby. The electric echo signals are outputted from the ultrasonic probe 1 to the receiving circuit 3. The electric echo signals are in plural channels.

The electric echo signals are processed by the receiving circuit 3 into second echo signals. The second echo signals, that is, the output signals of the receiving circuit 3, are applied to a delaying and combining circuit 4. Regarding each of the channels, the device 4 provides suitable delay times to the second echo signals respectively, and combines the resultant delayed signals into a composite echo signal.

Generally, the composite echo signal generated by the delaying and combining circuit 4 has wide-band noise components in addition to desired information components. An effective way of providing a low-noise sectional image of the examined body M is to remove noise components from the frequency band of the composite echo signal. Generally, due to characteristics of ultrasonic wave in a body, an electric echo signal related to a deeper portion of the body has more attenuated high-frequency components. Therefore, the frequency band of the composite echo signal shifts toward a lower side as the composite echo signal relates to a deeper portion of the examined body M.

The composite echo signal is outputted from the delaying and combining circuit 4 to a tunable filter (a tunable band pass filter) 6. The tunable filter 6 removes noise components from the composite echo signal. The tunable filter 6 has a pass band which is shifted in response to a tuning control signal fed from a filter control circuit 14. A portion of the examined body M which relates to the current composite echo signal moves in depth as time goes by. Thus, the frequency band of desired information components of the composite echo signal moves as time goes by. The combination of the tunable filter 6 and the filter control circuit 14 is designed to compensate for this time-dependent movement of the frequency band of desired information components of the composite echo signal. Specifically, the pass band of the tunable filter 6 is shifted so as to follow the frequency band of desired information components of the composite echo signal.

The tunable filter 6 includes a variable capacitance diode. The pass band of the tunable filter 6 shifts in accordance with a control voltage applied to the variable capacitance diode. The tuning control signal outputted from the filter control circuit 14 is applied to the variable capacitance diode as a control voltage. To shift the pass band of the tunable filter 6 with a change in the frequency band of desired information components of the composite echo signal, the filter control circuit 14 varies the voltage of the tuning control signal in a preset curve as time goes by.

A logarithmic detection circuit 7 receives the output signal of the tunable filter 6, and reduces the dynamic range of the output signal of the tunable filter 6 to a level matching the dynamic range of a display 10. In addition, the logarithmic detection circuit 7 converts the output signal of the tunable filter 6 into a corresponding intermediate-frequency signal. Specifically, the device 7 subjects the output signal of the tunable filter 6 to logarithmic compression and amplitude envelope detection.

A gain control circuit (an amplitude control circuit) 15 outputs a gain control signal to an adder 8. The adder 8 also receives the output signal of the logarithmic detection circuit 7. The device 8 adds and combines the output signals of the logarithmic detection circuit 7 and the gain control circuit 15. The gain control signal fed from the gain control circuit 15 to the adder 8 is adjusted in response to operator's requirement so that the brightness of a sectional image on the display 10 can be controlled at a level desired by the operator.

An A/D (analog-to-digital) converter 9 receives the output signal of the adder 8. The A/D converter 9 changes the output signal of the adder 8 into a corresponding digital signal while being controlled in response to reference voltages fed from a suitable device (not shown). The reference voltages determine the input dynamic range or the input window of the A/D converter 9.

The display 10 receives the output signal of the A/D converter 9. The display 10 includes a digital scanning converter which changes the output signal of the A/D converter 9 into a corresponding video signal of a given scanning format suited to indication on the screen of the display 10. The display 10 indicates a sectional image of the examined body M on its screen in response to the output signal of the A/D converter 9.

The tunable filter 6 tends to have the following problem. The control-signal response characteristic and the frequency response characteristic tend to vary from filter to filter. Accordingly, during manufacture of the prior-art ultrasonic diagnostic apparatus, many filter samples are prepared, and one of the samples which has characteristics near desired characteristics is selected as an actually-used tunable filter 6. In addition, after the tunable filter 6 is placed in position within the prior-art ultrasonic diagnostic apparatus, it is necessary to adjust the pass band characteristic of the tunable filter 6 by human operation. Furthermore, it is necessary to adjust the logarithmic conversion characteristic (the logarithmic linearity characteristic) and the offset characteristic of the logarithmic detection circuit 7 by human operation.

First Embodiment

With reference to FIG. 2, an ultrasonic diagnostic apparatus according to a first embodiment of this invention includes an ultrasonic probe 1 electrically connected to the output terminal of a transmission circuit 2 and the input terminal of a receiving circuit 3. The ultrasonic diagnostic apparatus is also referred to as the apparatus. The output terminal of the receiving circuit 3 is connected to the input terminal of a delaying and combining circuit 4. The output terminal of the delaying and combining circuit 4 is connected to a first input terminal of a selector or switch 5.

The output terminal of a signal generator 13 is connected to a second input terminal of the switch 5. The signal generator 13 has a control terminal connected to a main controller 12. The switch 5 has a control terminal connected to the main controller 12. The output terminal of the switch 5 is connected to the input terminal of a tunable filter (a tunable band pass filter) 6. The switch 5 selects either the output signal of the delaying and combining circuit 4 or the output signal of the signal generator 13 in response to a switch control signal fed from the main controller 12, and transmits the selected signal to the tunable filter 6.

The tunable filter 6 has a control terminal connected to the output terminal of a filter control circuit 14. The filter control circuit 14 has a control terminal connected to the main controller 12. The output terminal of the tunable filter 6 is connected to the input terminal of a logarithmic detection circuit 7. The output terminal of the logarithmic detection circuit 7 is connected to a first input terminal of an adder 8. The output terminal of an amplitude control circuit (a gain control circuit) 15 is connected to a second input terminal of the adder 8. The amplitude control circuit 15 has a control terminal connected to the main controller 12.

The output terminal of the adder 8 is connected to the input terminal of an A/D (analog-to-digital) converter 9. The A/D converter 9 has a control terminal connected to the output terminal of a reference voltage control circuit 16. The reference voltage control circuit 16 has a control terminal connected to the main controller 12. The output terminal of the A/D converter 9 is connected to the input terminal of a display 10 and the input terminal of a memory 11. The output terminal of the memory 11 is connected to the main controller 12.

Operation of the ultrasonic diagnostic apparatus of FIG. 2 can be changed among a first calibration mode, a second calibration mode, and a normal mode. The first calibration mode of operation is designed for adjustment or calibration of the characteristics of the tunable filter 6. The second calibration mode of operation is designed for adjustment or calibration of the characteristics of the logarithmic detection circuit 7. When the ultrasonic diagnostic apparatus is actually used, its operation is set to the normal mode. Generally, the first calibration mode of operation and the second calibration mode of operation are executed immediately after the ultrasonic diagnostic apparatus has been manufactured. Thus, the first calibration mode of operation and the second calibration mode of operation precede the normal mode of operation.

The main controller 12 includes a microcomputer or a similar device having a combination of an I/O port, a CPU, a RAM, and a ROM. The main controller 12 also includes a nonvolatile memory or a memory supported by a backup system. The main controller 12 operates in accordance with a program stored in the ROM. The program is designed to enable the main controller 12 to execute various processes which will be described later. Generally, the main controller 12 selects one of the first calibration mode of operation, the second calibration mode of operation, and the normal mode of operation in response to a mode selection signal outputted from a manual switch (not shown).

A description will now be given of the normal mode of operation of the ultrasonic diagnostic apparatus of FIG. 2. When the ultrasonic diagnostic apparatus is actually used, the ultrasonic probe 1 remains in contact with the surface of an examined body M such as a human body.

The ultrasonic probe 1 includes an array of piezoelectric transducers (electric-ultrasonic transducers). During the normal mode of operation of the apparatus, the piezoelectric transducers are sequentially activated by electric output signals of the transmission circuit 2 so that pulses of a beam of ultrasonic wave are emitted into the examined body M.

Echoes of the pulses of the ultrasonic wave beam are generated at organs of the examined body M. The ultrasonic echo pulses are received by the ultrasonic probe 1, being converted into corresponding electric echo signals thereby.

The electric echo signals are outputted from the ultrasonic probe 1 to the receiving circuit 3. The electric echo signals are in plural channels.

The electric echo signals are processed by the receiving circuit 3 into second echo signals. The second echo signals, that is, the output signals of the receiving circuit 3, are applied to the delaying and combining circuit 4. Regarding each of the channels, the device 4 provides suitable delay times to the second echo signals respectively, and combines the resultant delayed signals into a composite echo signal.

Generally, the composite echo signal generated by the delaying and combining circuit 4 has wide-band noise components in addition to desired information components. An effective way of providing a low-noise sectional image of the examined body M is to remove noise components from the frequency band of the composite echo signal. Generally, due to characteristics of ultrasonic wave in a body, an electric echo signal related to a deeper portion of the body has more attenuated high-frequency components. Therefore, the frequency band of the composite echo signal shifts toward a lower side as the composite echo signal relates to a deeper portion of tile examined body M.

The composite echo signal is outputted from the delaying and combining circuit 4 to the switch 5. During the normal mode of operation of the apparatus, the switch 5 selects the composite echo signal and transmits the composite echo signal to the tunable filter in response to the switch control signal fed from the main controller 12.

The tunable filter 6 removes noise components from the composite echo signal. The tunable filter 6 has a pass band which is shifted in response to a tuning control signal fed from the filter control circuit 14. A portion of the examined body M which relates to the current composite echo signal moves in depth as time goes by. Thus, the frequency band of desired information components of the composite echo signal moves as time goes by. The combination of the tunable filter 6 and the filter control circuit 14 is designed to compensate for this time-dependent movement of the frequency band of desired information components of the composite echo signal. Specifically, the pass band of the tunable filter 6 is shifted so as to follow the frequency band of desired information components of the composite echo signal.

The tunable filter 6 includes a variable capacitance diode. The pass band of the tunable filter 6 shifts in accordance with a control voltage applied to the variable capacitance diode. The tuning control signal outputted from the filter control circuit 14 is applied to the variable capacitance diode as a control voltage. To shift the pass band of the tunable filter 6 with a change in the frequency band of desired information components of the composite echo signal, the filter control circuit 14 varies the voltage of the tuning control signal in a preset curve as time goes by. The filter control circuit 14 executes the variation of the tuning control signal according to information of a filter control curve set therein. The filter control circuit 14 contains a memory for storing the information of the filter control curve.

As will be described later, the operation of the combination of the tunable filter 6 and the filter control circuit 14 has been calibrated during the first calibration mode of operation of the apparatus prior to the normal mode of operation.

The logarithmic detection circuit 7 receives the output signal of the tunable filter 6, and reduces the dynamic range of the output signal of the tunable filter 6 to a level matching the dynamic range of the display 10. In addition, the logarithmic detection circuit 7 converts the output signal of the tunable filter 6 into a corresponding intermediate-frequency signal. Specifically, the device 7 subjects the output signal of the tunable filter 6 to logarithmic compression and amplitude envelope detection.

The gain control circuit 15 outputs a gain control signal to the adder 8. The adder 8 also receives the output signal of the logarithmic detection circuit 7. The device 8 adds and combines the output signals of the logarithmic detection circuit 7 and the gain control circuit 15. The gain control signal fed from the gain control circuit 15 to the adder 8 is adjusted in response to operator's requirement so that the brightness of a sectional image on the display 10 can be controlled at a level desired by the operator.

The A/D converter 9 receives the output signal of the adder 8. The A/D converter 9 changes the output signal of the adder 8 into a corresponding digital signal while being controlled in response to reference voltages fed from the reference voltage control circuit 16. The reference voltages determine the input dynamic range or the input window of the A/D converter 9.

The display 10 receives the output signal of the A/D converter 9. The display 10 includes a digital scanning converter which changes the output signal of the A/D converter 9 into a corresponding video signal of a given scanning format suited to indication on the screen of the display 10. The display 10 indicates a sectional image of the examined body M on its screen in response to the output signal of the A/D converter 9.

A description will now be given of the first calibration mode of operation of the ultrasonic diagnostic apparatus of FIG. 2. The first calibration mode of operation of the apparatus is executed before the second calibration mode of operation and the normal mode of operation. The first calibration mode of operation of the apparatus is designed to adjust or correct (calibrate) information of a filter control curve set in the filter control circuit 14.

During the first calibration mode of operation of the apparatus, the signal generator 13 outputs a sine-wave (sinusoidal) reference signal. The sine-wave reference signal is also referred to as the calibration signal. The frequency and the amplitude of the output signal of the signal generator 13 are selected from among predetermined different frequencies and amplitudes in response to a control signal fed from the main controller 12.

For example, the signal generator 13 is controlled to sequentially output one of a first reference signal (a first calibration signal) S1 having a frequency of 2.5 MHz and an amplitude of −9 dBm, and a second reference signal (a second calibration signal) S2 having a frequency of 7.0 MHz and an amplitude of −9 dBm.

The output signal of the signal generator 13 is applied to the switch 5. During the first calibration mode of operation of the apparatus, the switch 5 selects the output signal of the signal generator 13 and transmits the selected signal to the tunable filter 6 in response to the switch control signal fed from the main controller 12.

The main controller 12 controls the signal generator 13 so that the signal generator 13 will output the first reference signal S1 at a start of the first calibration mode of operation of the apparatus. The first reference signal S1 is transmitted from the signal generator 13 to the tunable filter 6 via the switch 5. The main controller 12 controls the filter control circuit 14 so that a filter control signal (a tuning control signal) VF fed to the tunable filter 6 from the filter control circuit 14 will vary as time goes by. This variation in the filter control signal VF sweeps or shifts the central frequency of the pass band of the tunable filter 6 from a lower side to an upper side.

It is now assumed that the voltage of the filter control signal VF linearly increases as time goes by, and that the central frequency of the pass band of the tunable filter 6 linearly varies in accordance with the voltage of the filter control signal VF. During the first calibration mode of operation of the apparatus, the amplitude control circuit 15 and the reference voltage control circuit 16 are controlled by the main controller 12 so that the output signals thereof will remain at given states suited for calibration.

The first reference signal S1, that is, the sine-wave (sinusoidal) reference signal having a frequency of 2.5 MHz and an amplitude of −9 dBm, is subjected to amplitude modulation due to the time-dependent variation of the pass band characteristics of the tunable filter 6. The output signal of the tunable filter 6 is successively processed by the logarithmic detection circuit 7, the adder 8, and the A/D converter 9. The memory 11 is controlled by the main controller 12 so that the output signal of the A/D converter 12 which corresponds to the first reference signal S1 is stored into the memory 11. As shown in the part (a) of FIG. 3, the detection value or level represented by the signal stored in the memory 11 varies as a function of the voltage of the filter control signal VF. Specifically, the detection value peaks when the voltage of the filter control signal VF agrees with a voltage V1. This peak results from the fact that the level of the output signal of the tunable filter 6 is maximized when the central frequency of the pass band of the tunable filter 6 reaches the frequency (2.5 MHz) of the first reference signal S1. The main controller 12 derives the correspondence relation between the detection values represented by the signal stored in the memory 11 and the voltage values of the filter control signal VF by referring to the control signal fed to the filter control circuit 14. The main controller 12 compares the detection values with each other to determine the maximum of the detection values. The main controller 12 detects the voltage value V1 of the filter control signal VF which corresponds to the maximum of the detection values. The main controller 12 stores information (data) of the voltage value V1 into the internal RAM as a detection value related to the first reference signal S1.

Then, the main controller 12 controls the signal generator 13 so that the signal generator 13 will output the second reference signal S2. The second reference signal S2 is transmitted from the signal generator 13 to the tunable filter 6 via the switch 5. The tunable filter 6, the logarithmic detection circuit 7, the adder 8, the A/D converter 9, the memory. 11, the main controller 12, the filter control circuit 14, the amplitude control circuit 15, and the reference voltage control circuit 16 operate similarly to the previously-described operation on the first reference signal S 1.

Accordingly, the second reference signal S2, that is, the sine-wave (sinusoidal) reference signal having a frequency of 7.0 MHz and an amplitude of −9 dBm, is subjected to amplitude modulation due to the time-dependent variation of the pass band characteristics of the tunable filter 6. The output signal of the tunable filter 6 is successively processed by the logarithmic detection circuit 7, the adder 8, and the A/D converter 9. The memory 11 is controlled by the main controller 12 so that the output signal of the A/D converter 12 which corresponds to the second reference signal S2 is stored into the memory 11. As shown in the part (a) of FIG. 3, the detection value or level represented by the signal stored in the memory 11 varies as a function of the voltage of the filter control signal VF. Specifically, the detection value peaks when the voltage of the filter control signal VF agrees with a voltage V2. This peak results from the fact that the level of the output signal of the tunable filter 6 is maximized when the central frequency of the pass band of the tunable filter 6 reaches the frequency (7.0 MHz) of the second reference signal S2. The main controller 12 derives the correspondence relation between the detection values represented by the signal stored in the memory 11 and the voltage values of the filter control signal VF by referring to the control signal fed to the filter control circuit 14. The main controller 12 compares the detection values with each other to determine the maximum of the detection values. The main controller 12 detects the voltage value V2 of the filter control signal VF which corresponds to the maximum of the detection values. The main controller 12 stores information (data) of the voltage value V2 into the internal RAM as a detection value related to the second reference signal S2.

Figure 3B:
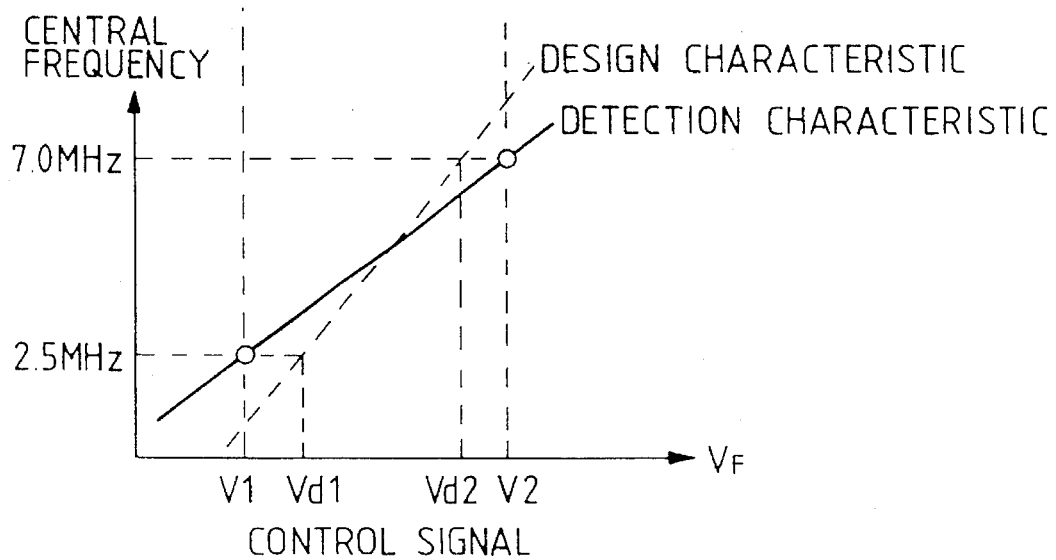

The true relation between the filter control signal and the filter pass-band central frequency is determined on the basis of the detection values V1 and V2 mud the frequencies, 2.5 MHz and 7.0 MHz, and is denoted by the straight line in the part (b) of FIG. 3. The true relation between the filter control signal and the filter pass-band central frequency is referred to as the detection characteristics. Also, the relation between the filter control signal and the filter pass-band central frequency is determined on the basis of design values Vd1 and Vd2 and the frequencies, 2.5 MHz and 7.0 MHz, and is denoted by the broken line in the part (b) of FIG. 3. This relation between the filter control signal and the filter pass-band central frequency is referred to as the design characteristics. Specifically, the filter pass-band central frequency Fdet (MHz) according to the detection characteristics and the filter pass-band central frequency Fdes (MHz) according to the design characteristics are given as follows.

$$Fdet=\{4.5/(V2-V1)\}.VF+\{7.0-4.5.V2/(V2-V1)\} \quad \ldots (1)$$

$$Fdes=\{4.5/(Vd2-Vd1)\}.VF+\{7.0-4.5.Vd2/(Vd2-Vd1)\} \quad \ldots (2)$$

As previously described, during the normal mode of operation of the apparatus, to shift: the pass band of the tunable filter 6 with a change in the frequency band of desired information components of the composite echo signal, the filter control circuit 14 varies the voltage of the tuning control signal (the filter control signal) by referring to information of a filter control curve (a variation curve) preset therein. An example of the initial variation curve or the design variation curve is denoted by the broken curve in FIG. 4. The variable VFint(t) is now introduced to indicate the voltage of the filter control signal corresponding to the initial variation curve.

During the first calibration mode of operation of the apparatus the main controller 12 generates information of a calibration-resultant signal and updates the information of the initial variation curve into the information of the calibration-resultant variation curve. The variable VFcal (t) is now introduced to indicate the voltage of the filter control signal corresponding to the calibration-resultant variation curve. Specifically, the main controller 12 calculates the voltage VFcal(t) of the filter control signal corresponding to the calibration-resultant variation curve by referring to the following equation.

$$VFcal(t)=\{(V2-V1)/(Vd2-Vd1)\}.\{VFint(t) -Vd2+V2.(Vd2-Vd1)/(V2-V1)\} \quad \ldots (3)$$

Figure 4:
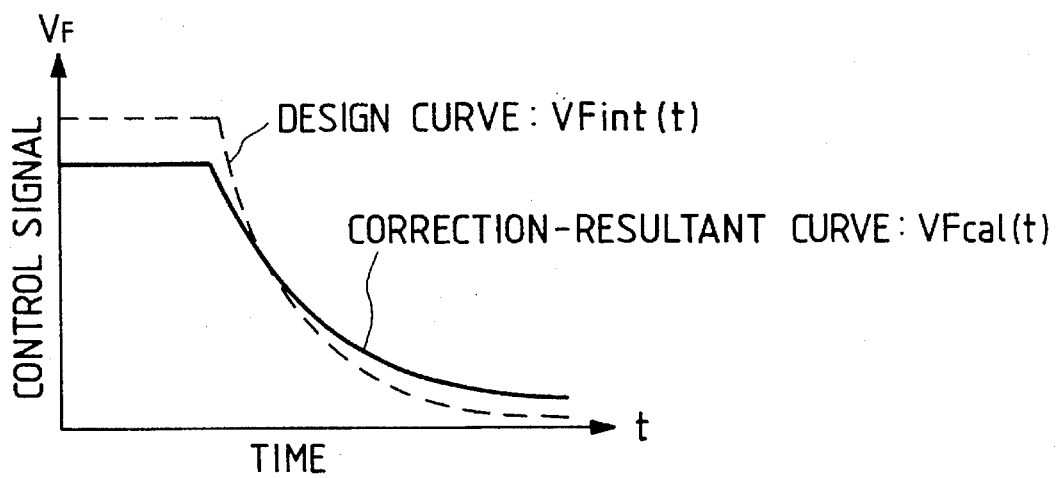
FIG. 4 is a time-domain diagram of the filter control signal in the apparatus of FIG. 1.

When the equation (3) is used as a corrective equation for the initial filter control curve (the design filter control curve) set in the filter control circuit 14, the initial filter control curve VFint(t) denoted by the broken curve in FIG. 4 is corrected into the calibration-resultant filter control curve VFcal(t) denoted by the solid curve in FIG. 4. The main controller 12 replaces the information of the initial variation curve with the information of the calibration-resultant variation curve in the filter control circuit 14. As a result, the first calibration mode of operation of the apparatus is completed.

A description will now be given of the second calibration mode of operation of the ultrasonic diagnostic apparatus of FIG. 2. The second calibration mode of operation of the apparatus is executed after the first calibration mode of operation and before the normal mode of operation. The second calibration mode of operation of the apparatus is designed to adjust or correct the logarithmic conversion characteristic (the logarithmic linearity characteristic) and the offset characteristic of the logarithmic detection circuit 7.

Two reference voltages Vt and Vb are preset in the reference voltage control circuit 16. The reference voltage control circuit 16 serves to adjust the input dynamic range or the input window of the A/D converter 9 in response to the reference voltages Vt and Vb. The second calibration mode of operation of the apparatus is executed to generate corrective values for the reference voltages Vt and Vb. The corrective values enable calibration regarding errors in the logarithmic conversion characteristic of the logarithmic detection circuit 7 and offsets generated in the logarithmic detection circuit 7 and the adder 8.

During the second calibration mode of operation of the apparatus, the signal generator 13 outputs a sine-wave (sinusoidal) reference signal. The sine-wave reference signal is also referred to as the calibration signal. The frequency and the amplitude of the output signal of the signal generator 13 are selected from among predetermined different frequencies and amplitudes in response to the control signal fed from the main controller 12.

For example, the signal generator 13 is controlled to sequentially output one of a third reference signal (a third calibration signal) S3 having a frequency of 5.0 MHz and an amplitude of −9 dBm, and a fourth reference signal (a fourth calibration signal) S4 having a frequency of 5.0 MHz and an amplitude of −49 dBm.

The output signal of the signal generator 13 is applied to the switch 5. During the second calibration mode of operation of the apparatus, the switch 5 selects the output signal of the signal generator 13 and transmits the selected signal to the tunable filter 6 in response to the switch control signal fed from the main controller 12.

The main controller 12 controls the signal generator 13 so that the signal generator 13 will output the third reference signal S3 at a start of the second calibration mode of operation of the apparatus. The third reference signal S3, that is, the sine-wave (sinusoidal) reference signal having a frequency of 5.0 MHz and an amplitude of −9 dBm, is transmitted from the signal generator 13 to the tunable filter 6 via the switch 5. The main controller 12 controls the filter control circuit 14 so that the central frequency of the pass band of the tunable filter 6 will be equal to 5.0 MHz. In addition, the main controller 12 controls the amplitude control circuit 15 so that the voltage of the output signal of the amplitude control circuit 15 will be equal to 0 V. Furthermore, the main controller 12 controls the reference voltage control circuit 16 so that the reference voltage control circuit 16 will output reference voltages Vt and Vb maximizing the input dynamic range or the input window of the A/D converter 9.

The third reference signal S3 is processed by the tunable filter 6, and the related output signal of the tunable filter 6 is successively processed by the logarithmic detection circuit 7, the adder 8, and the A/D converter 9. The memory 11 is controlled by the main controller 12 so that the output signal of the A/D converter 12 which corresponds to the third reference signal S3 is stored into the memory 11. The main controller 12 reads out the stored signal from the memory 11, and writes the readout signal into the internal RAM as a detection value V3 related to the third reference signal S3.

Then, the main controller 12 controls the signal generator 13 so that the signal generator 13 will output the fourth reference signal S4. The fourth reference signal S4, that is, the sine-wave (sinusoidal) reference signal having a frequency of 5.0 MHz and an amplitude of −49 dBm, is transmitted from the signal generator 13 to the tunable filter 6 via the switch 5. The tunable filter 6, the logarithmic detection circuit 7, the adder 8, the A/D converter 9, the memory 11, the main controller 12, the filter control circuit 14, the amplitude control circuit 15, and the reference voltage control circuit 16 operate similarly to the previously-described operation on the third reference signal S3.

Accordingly, the fourth reference signal S4 is processed by the tunable filter 6, and the related output signal of the tunable filter 6 is successively processed by the logarithmic detection circuit 7, the adder 8, and the A/D converter 9. The memory 11 is controlled by the main controller 12 so that the output signal of the A/D converter 12 which corresponds to the fourth reference signal S4 is stored into the memory 11. The main controller 12 reads out the stored signal from the memory 11, and writes the readout signal into the internal RAM as a detection value V4 related to the fourth reference signal S4.

Figure 5:
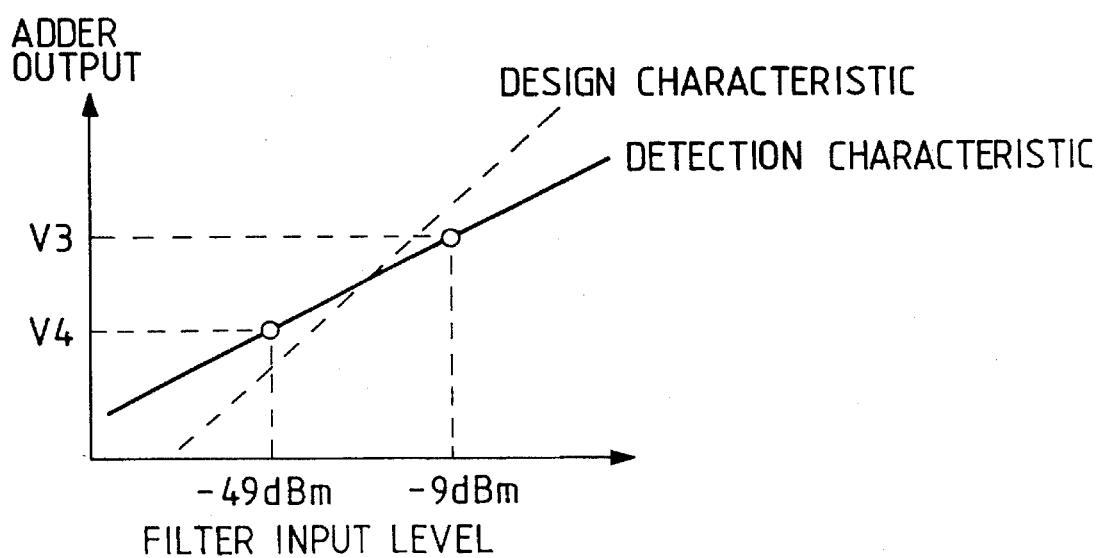
FIG. 5 is a diagram of a relation between a filter input level and an adder output level in the apparatus of FIG. 1.

The true relation between the filter input level and the adder output level is determined on the basis of the detection values V3 and V4 and the amplitudes, −9 dBm and −49 dBm, and is denoted by the straight line in FIG. 5. The true relation between the filter input level and the adder output level is referred to as the detection logarithmic conversion characteristics. Also, the relation between the filter input level and the adder output level is determined on the basis of design values and the amplitudes, −9 dBm and −49 dBm, and is denoted by the broken line in FIG. 5. This relation between the filter input level and the adder output level is referred to as the design logarithmic conversion characteristics. According to the detection logarithmic conversion characteristics, the level Vout [volt] of the output signal of the adder 8 is expressed by the following equation with respect to the level Vin [dbm] of the signal inputted into the tunable filter 6.

$$Vout=\{(V4-V3)/40\}.Vin+(40.V3+9.V4)/49 \quad \ldots (4)$$

The detection logarithmic conversion characteristics given by the equation (4) agree with the superimposition of the design logarithmic conversion characteristics and errors caused in the logarithmic detection circuit 7, and contain offsets generated in the logarithmic detection circuit 7 and the adder 8. The main controller 12 uses the equation (4) as a corrective equation for the design logarithmic conversion characteristics and the offsets, and calculates desired values Vt and Vb of the output reference voltages from the reference voltage control circuit 16 in response to a required display dynamic range (an indication dynamic rage) of the apparatus. For example, in the case where the required display dynamic range is equal to 60 dB, the desired value Vt is set equal to the level of the output signal of the logarithmic detection circuit 7 which corresponds to an input level (amplitude) of 0 dBm while the desired value Vb is set equal to the level of the output signal of the logarithmic detection circuit 7 which corresponds to an input level (amplitude) of −60 dBm. Specifically, the main controller 12 calculates the desired values Vt and Vb by referring to the following equations.

$$Vt=(40.V3+9.V4)/49 \quad Vb=\{(V4-V3)/40\}.(-60)+(40.V3+9.V4)/49. \quad (5)$$

During the normal mode of operation of the apparatus, the main controller 12 controls the reference voltage control circuit 16 so that the levels of the reference voltages outputted therefrom will agree with the desired values Vt and Vb respectively. In the case where an amplitude addition "A" [dB] is required with respect to the output signal of the logarithmic detection circuit 7, the main controller 12 controls the amplitude control circuit 15 so that the amplitude control circuit 15 will output a control signal having a voltage Vamp [V] given as follows.

$$Vamp=\{(V4-V3)/40\}.A \quad \ldots (6)$$

For example, in the case where an amplitude addition of 10 dB is required with respect to the output signal of the logarithmic detection circuit 7, the voltage Vamp [V] of the output control signal from the amplitude control circuit 15 is given as follows.

$$Vamp=\{(V4-V3)/40\}.10$$

During the second calibration mode of operation of the apparatus, the main controller 12 stores information of the detection value V3, information of the detection value V4, information of the equation (4), and information of the equation (6) into the nonvolatile memory or the memory supported by the backup system. As a result, the second calibration mode of operation of the apparatus is completed.

The ultrasonic diagnostic apparatus of FIG. 2 may be modified to also use nonlinear components of the relation between the filter control signal and the central frequency of the pass band of the tunable filter 6. In this case, it is preferable that the signal generator 13 is replaced by a signal generator which can produce additional signals of two or more different frequencies, and that a corrective equation is derived which includes a third-order approximate equation.

The ultrasonic diagnostic apparatus of FIG. 2 may be modified to also use nonlinear components of the logarithmic conversion characteristics of the logarithmic detection circuit 7. In this case, it is preferable that the signal generator 13 is replaced by a signal generator which can produce additional signals of two or more different frequencies, and that corrective equations are derived which include third-order approximate equations.

Second Embodiment

Figure 6:
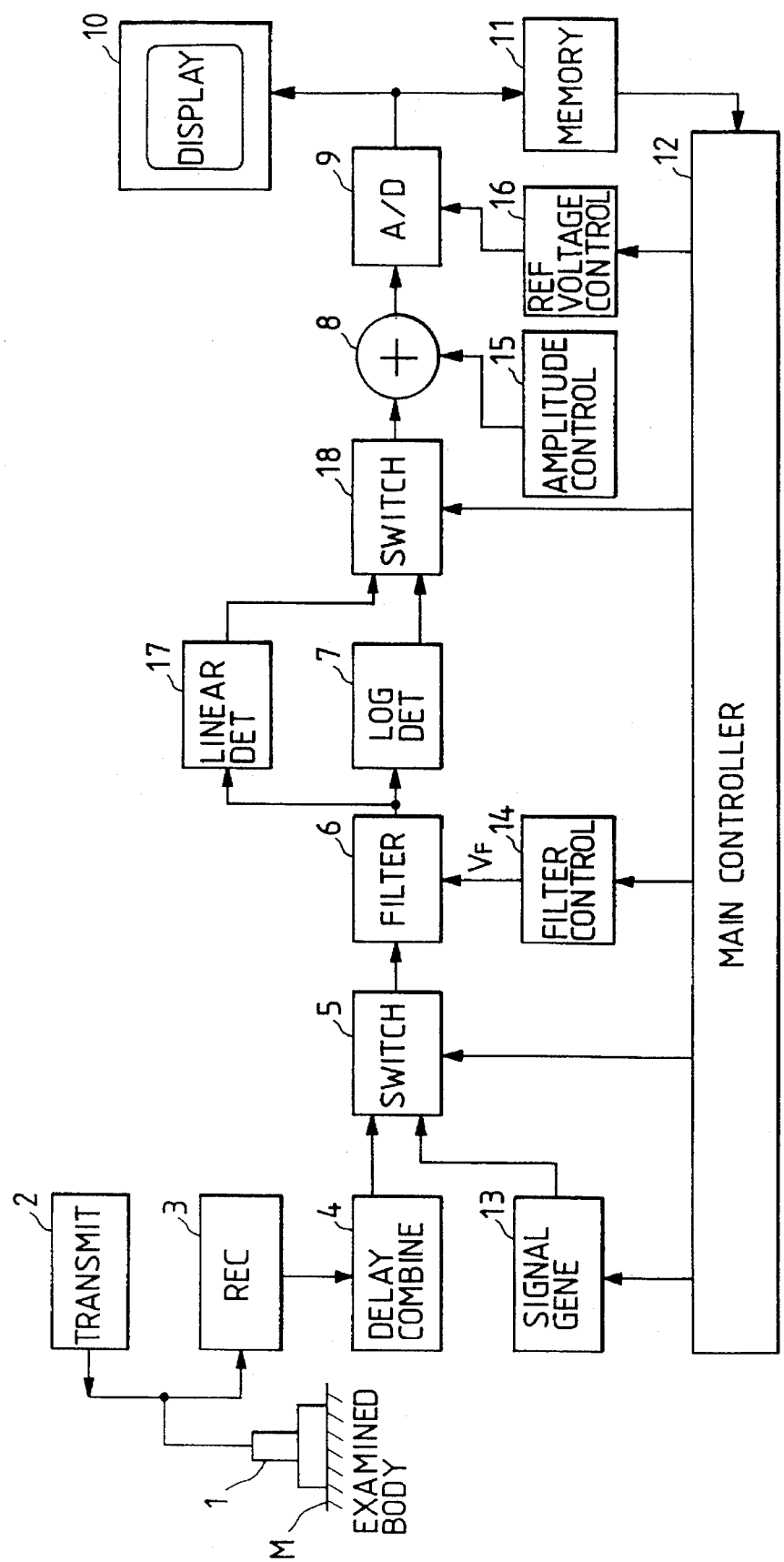
FIG. 6 is a block diagram of an ultrasonic diagnostic apparatus according to a second embodiment of this invention.

FIG. 6 shows an ultrasonic diagnostic apparatus according to a second embodiment of this invention which is similar to the embodiment of FIGS. 2–5 except for design changes indicated hereinafter.

The ultrasonic diagnostic apparatus of FIG. 6 includes a linear detection circuit 17 and a selector or switch 18. The input terminal of the linear detection circuit 17 is connected to the output terminal of a tunable filter 6. The output terminal of the linear detection circuit 17 is connected to a first input terminal of the switch 18. The output terminal of a logarithmic detection circuit 7 is connected to a second input terminal of the switch 18. The output terminal of the switch 18 is connected to a first input terminal of an adder 8. The switch 18 has a control terminal connected to a main controller 12. The switch 18 selects either the output signal of the logarithmic detection circuit 7 or the output signal of the linear detection circuit 17 in response to a switch control signal fed from the main controller 12, and transmits the selected signal to the adder 8.

The linear detection circuit 17 serves to subject the output signal of the tunable filter 6 to only amplitude envelope detection. On the other hand, the logarithmic detection circuit 7 serves to subject the output signal of the tunable filter 6 to both logarithmic compression and amplitude envelope detection.

During a first calibration mode of operation of the apparatus, the switch 18 is controlled by the main controller 12 to select the output signal of tile linear detection circuit 17. During a second calibration mode of operation of the apparatus, the switch 18 is controlled by the main controller 12 to select the output signal of the logarithmic detection circuit 7.

This embodiment is advantageous in providing a higher accuracy of calibration related to the tunable filter 6.

Third Embodiment

A third embodiment of this invention is similar to the embodiment of FIGS. 2–5 except for design changes indicated hereinafter. In the third embodiment, a main controller 12 (see FIG. 2) responds to a signal generated from an apparatus power supply switch (not shown). During a start of an ultrasonic diagnostic apparatus between the moment of movement of the power supply switch to its on state and the moment of indication of an image on a display 10 (see FIG. 2), the main controller 12 serves to execute first and second calibration modes of operation of the apparatus.

Fourth Embodiment

A fourth embodiment of this invention is similar to the embodiment of FIGS. 2–5 except for design changes indicated hereinafter. In the fourth embodiment, a manually-operated input device (not shown) such as a key board is connected to a main controller 12 (see FIG. 2). A predetermined instruction of starting first and second calibration modes of operation of an ultrasonic diagnostic apparatus can be fed to the main controller 12 by actuating the input device. This instruction is denoted by a sequence of characters such as "CAL$ON" When the main controller 12 receives this instruction from the input device, the main controller 12 starts and executes the first and second calibration modes of operation of the apparatus.

The input device may be used by the operator (the user) for feeding the apparatus with various instructions such as an instruction of changing the mode of indication of an image on a display 10 (see FIG. 2), an instruction of changing the characteristics of a normal mode of operation of the apparatus, an instruction of adjusting the characteristics of the indication of the image, and an instruction denoted by a sequence of characters.

Fifth Embodiment

A fifth embodiment of this invention is similar to the embodiment of FIGS. 2–5 except for design changes indicated hereinafter. In the fifth embodiment, a main controller 12 (see FIG. 2) is directly connected to a display 10 (see FIG. 2). The display 10 is controlled by the main controller 12 to indicate operating conditions of an ultrasonic diagnostic apparatus, results of various measurements, and other information in addition to a sectional image of an examined body M.

When first and second calibration modes of operation of the apparatus are started, the display 10 is controlled by the main controller 12 to indicate "Calibration Start". During the first calibration mode of operation of the apparatus for calibration related to a tunable filter 6 (see FIG. 2), the display 10 is controlled by the main controller 12 to indicate "Calibration for Filter". During the second calibration mode of operation of the apparatus for calibration related to offsets and logarithmic conversion characteristics of a logarithmic detection circuit 7 (see FIG. 2), the display 10 is controlled by the main controller 12 to indicate "Calibration for Log/Det". When the first and second calibration modes of operation of the apparatus are completed, the display 10 is controlled by the main controller 12 to indicate "Completed".

It is preferable that, in the main controller 12, predetermined normal ranges are preset with respect to corrective values for the characteristics of the tunable filter 6. In this case, the main controller 12 compares the corrective values with the normal ranges to determine whether or not the tunable filter 6 is wrong. When the corrective values exist outside the normal ranges, that is, when the tunable filter 6 is wrong, the display 10 is controlled by the main controller 12 to indicate "Calibration Error with Filter". It is good to execute the indication of the wrong condition of the tunable filter 6 at an end of the first calibration mode of operation of the apparatus. In the presence of the wrong condition of the tunable filter 6, it is preferable to prevent the indication of "Completed".

It is preferable that, in the main controller 12, a predetermined normal range is preset with respect to a difference of (V4-V3) in the previously-indicated equation (4) which is determined by calibration related to the offsets and the logarithmic conversion characteristics of the logarithmic detection circuit 7. In this case, the main controller 12 compares the difference of (V4-V3) with the normal range to determine whether or not the logarithmic detection circuit 7 is wrong. When the difference of (V4-V3) exists outside the normal range, that is, when the logarithmic detection circuit 7 is wrong, the display 10 is controlled by the main controller 12 to indicate "Calibration Error with Log/Det". It is good to execute the indication of the wrong condition of the logarithmic detection circuit 7 at an end of the second calibration mode of operation of the apparatus. In the presence of the wrong condition of the logarithmic detection circuit 7, it is preferable to prevent the indication of "Completed".

What is claimed is:

1. An ultrasonic diagnostic apparatus comprising:
   means for emitting an ultrasonic wave into an examined body;
   means for generating a first electric echo signal in response to an echo of the ultrasonic wave;
   a controllable filter responsive to a control signal for extracting components of the first electric echo signal which are in a desired frequency band, and thereby converting the first electric echo signal into a second electric echo signal;
   a logarithmic detection device for subjecting the second electric echo signal to logarithmic compression and detection;
   a signal generator for outputting plural calibration signals having different frequencies and different amplitudes;
   input selection means for connecting the signal generator with an input terminal of the filter during a calibration mode of operation;

control means for calculating a corrective value from an output signal of the logarithmic detection device during the calibration mode of operation, and correcting a logarithmic conversion characteristic and an offset of the logarithmic detection device and the control signal to the filter in response to the calculated corrective value during reception of echoes of the ultrasonic wave.

2. The ultrasonic diagnostic apparatus of claim 1, further comprising a linear detection device for subjecting the second electric echo signal to detection without logarithmic compression, and means for selecting one of an output signal of the linear detection device and an output signal of the logarithmic detection device, and selecting the output signal of the linear detection device when an error in a pass band characteristic of the filter is corrected.

3. The ultrasonic diagnostic apparatus of claim 1, further comprising a display for indicating an image in response to the output signal of the logarithmic detection device, and means for correcting calibration of errors in a logarithmic conversion characteristic of the logarithmic detection circuit and a pass band characteristic of the filter during an apparatus starting interval immediately after a start of supply of an electric power and before a moment the image appears on the display.

4. The ultrasonic diagnostic apparatus of claim 1, further comprising an operation device for enabling an operator to command a change of an image indication mode, a change of a measurement mode, an adjustment of an image characteristic, and inputting of characters, and means for correcting calibration errors in a logarithmic conversion characteristic of the logarithmic detection circuit and a pass band characteristic of the filter when the operator inputs a calibration command by using the operation device.

5. The ultrasonic diagnostic apparatus of claim 1, further comprising a display for indicating an ultrasonic sectional image, results of various measurements, and apparatus operating conditions, and means for controlling the display to indicate the apparatus operating conditions at each of a start, an intermediate moment, and an end of correcting of errors in a logarithmic conversion characteristic of the logarithmic detection circuit and a pass band characteristic of the filter.

6. An ultrasonic diagnostic apparatus comprising:
   means for emitting ultrasonic wave into an examined body;
   means for generating a first electric echo signal in response to an echo of the ultrasonic wave;
   a controllable filter responsive to a control signal for extracting components of the first electric echo signal which are in a desired frequency band, and thereby converting the first electric echo signal into a second electric echo signal;
   a logarithmic detection device for subjecting the second electric echo signal to logarithmic compression and detection;
   a signal generator for outputting plural calibration signals having different frequencies and different amplitudes;
   input selection means for connecting the signal generator with an input terminal of the filter during a calibration mode of operation;
   a filter control device for controlling a pass band of the filter at a desired pass band;
   a gain control device for generating a gain control signal;
   an adder for adding an output signal of the logarithmic detection device and the gain control signal;
   an A/D converter for converting an output signal of the adder into a corresponding digital signal;
   a reference voltage control device for controlling a reference voltage fed to the A/D converter;
   a memory for storing an output signal of the A/D converter; and
   control means for controlling the input selection means to connect the signal generator with the input terminal of the filter during the calibration mode of operation, controlling the signal generator in accordance with a calibration sequence, reading out the signal from the memory and calculating corrective values for control signals outputted from the filter control device, the gain control device, and the reference voltage control device in response to the readout signal, and correcting the control signals outputted from the filter control device, the gain control device, and the reference voltage control device in response to the corrective values during reception of echoes of the ultrasonic wave.

7. An ultrasonic diagnostic apparatus comprising:
   a tunable filter having a controllable signal processing characteristic:
   means for generating an electric echo signal;
   means for generating a predetermined calibration signal;
   means for applying the calibration signal to the tunable filter during a first interval:
   means for generating a corrective signal in response to an output signal of the tunable filter during the first interval;
   means for applying the echo signal to the tunable filter in response to the corrective signal during the second interval; and
   means for controlling the characteristic of the tunable filter in response to the corrective signal during the second interval.

8. An ultrasonic diagnostic apparatus comprising:
   a logarithmic detector having a controllable signal processing characteristic:
   means for generating an electric echo signal;
   means for generating a predetermined calibration signal;
   means for applying the calibration signal to the logarithmic detector during a first interval:
   means for generating a corrective signal in response to an output signal of the logarithmic detector during the first interval; and
   means for applying the echo signal to the logarithmic detector in response to the corrective signal during the second interval.

* * * * *